United States Patent
Bayless et al.

[15] 3,674,704
[45] July 4, 1972

[54] PROCESS OF FORMING MINUTE CAPSULES AND THREE-PHASE CAPSULE-FORMING SYSTEM USEFUL IN SAID PROCESS

[72] Inventors: Robert G. Bayless; Charles P. Shank; Ruth A. Botham; Dennis W. Werkmeister, all of Dayton, Ohio

[73] Assignee: The National Cash Register Company, Dayton, Ohio

[22] Filed: March 29, 1971

[21] Appl. No.: 128,670

[52] U.S. Cl..............................252/316, 8/79, 106/308 M, 117/62.2, 117/100 A, 117/100 B, 264/4, 424/33
[51] Int. Cl. .....................................B01j 13/02, B44d 1/02
[58] Field of Search ..................252/316; 117/100 A; 264/4; 424/33

[56] References Cited

UNITED STATES PATENTS

| | | | |
|---|---|---|---|
| 2,702,264 | 2/1955 | Klaui | 424/33 |
| 3,415,758 | 12/1968 | Powell et al. | 252/316 |
| 3,423,489 | 1/1969 | Arens et al. | 264/4 |

Primary Examiner—Richard D. Lovering
Attorney—E. Frank McKinney and Robert J. Shafer

[57] ABSTRACT

A process is disclosed for manufacturing minute capsules, en masse, in a liquid manufacturing vehicle wherein the capsules contain water or aqueous solutions. The capsules have seamless walls of a specific kind of hydrophobic polymeric material which polymeric material has been found particularly impervious to permeation and diffusion by the aqueous contents. The hydrophobic polymeric material used is poly(ethylene-co-vinyl acetate) having the vinyl acetate groups hydrolyzed to vinyl alcohol groups in the amount of 38 to 55 percent.

8 Claims, 1 Drawing Figure

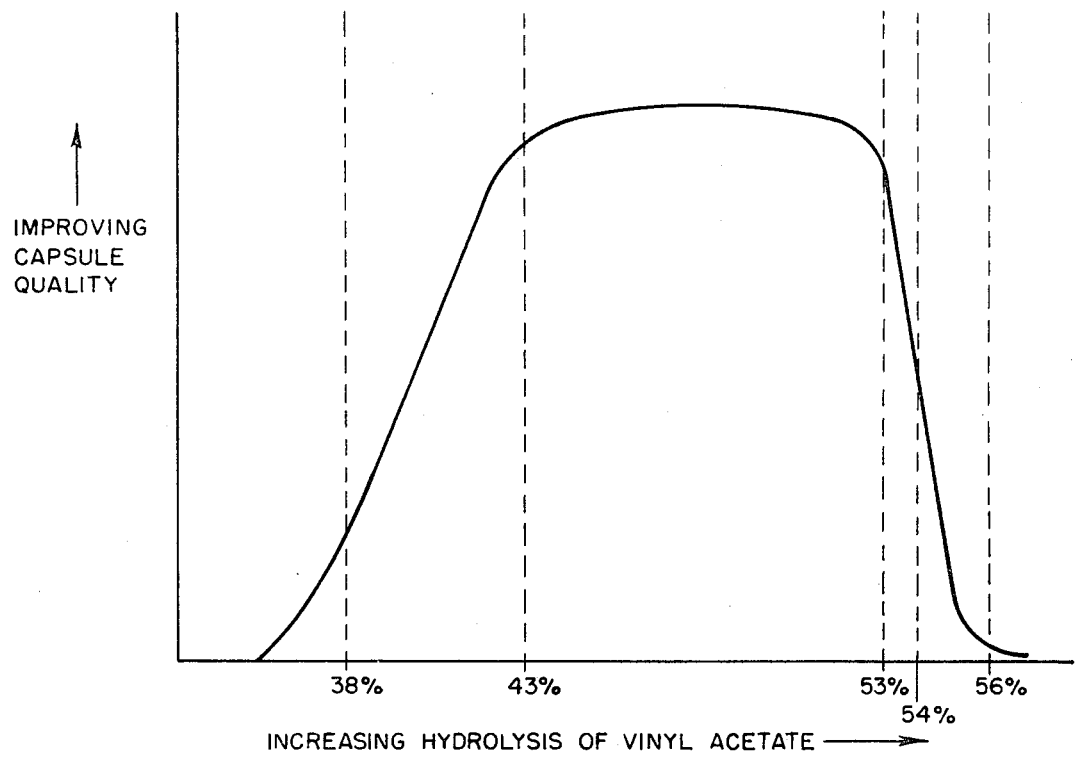

PROCESS OF FORMING MINUTE CAPSULES AND THREE-PHASE CAPSULE-FORMING SYSTEM USEFUL IN SAID PROCESS

BACKGROUND OF THE INVENTION

1. Field of the Invention

The present invention relates to minute capsules having hydrophobic polymeric wall material and containing water, aqueous solutions or water soluble materials. A process is disclosed for manufacturing the capsules, en masse, in a liquid vehicle. The capsule wall material is partially hydrolyzed poly(ethylene-co-vinyl acetate) and a particularly important feature of the invention resides in the discovery that the degree of hydrolysis of the polymeric capsule wall material is critical and that only a narrow range of materials is eligible for use. It should be noted that any reference hereinafter to poly(ethylene-co-vinyl acetate) means partially hydrolyzed poly(ethylene-co-vinyl acetate), unless otherwise specified.

The present invention embraces a specific process for manufacturing minute capsules wherein the capsule wall material is narrowly specified and wherein the capsules contain particular aqueous or water soluble compositions. The capsules are substantially spherical and are "minute" in size, which means that the capsules have average diameters of from about a few microns to several thousand microns.

2. Description of the Prior Art

U.S. Pat. No. 3,415,758 issued Dec. 10, 1968 on the application of Thomas C. Powell et al. and assigned to the assignee herein discloses and claims a process for manufacturing minute capsules, en masse, in a liquid manufacturing vehicle. The encapsulating process of that patent utilizes liquid-liquid phase separation of hydrophobic polymeric capsule wall material by addition of a phase-separation-inducing agent to a solution of the wall material. The encapsulated material must be insoluble in the capsule manufacturing vehicle and is generally water soluble. A general encapsulating process is taught by the Powell et al. patent. An encapsulating process is not taught therein with respect to the specific materials required in practice of the present invention to afford an improved product.

The capsules in that Powell et al. patent contain aqueous and water soluble compositions and the capsule wall material is disclosed to be hydrophobic polymeric material having water-wetting groups attached thereto. Although the above-identified patent discloses hydrophobic polymeric capsule wall materials, in general, there is no mention of the material now discovered and herein disclosed to be especially useful in containing aqueous compositions.

SUMMARY OF THE INVENTION

The preferred capsule-forming process of this invention involves the establishment of an encapsulating system which is characterized as follows (these terms being defined below):
1. It is un-ionized;
2. It is in an agitated state;
3. It comprises the following three phases characterized first of all by being mutually immiscible and further characterized, respectively, as being:
   a. a continuous liquid phase vehicle that constitutes at least about 75 percent by volume of the three phases in total,
   b. a discontinuous phase of minute, mobile entities of intended capsule core material, either solid or liquid, including water or water-like liquids, dispersed in the vehicle and constituting less than about 25 percent, by volume, of the three phases in total, and
   c. a discontinuous phase of minute, mobile entities of wall-forming material dispersed in the vehicle and constituted by a solution of partially hydrolyzed poly(ethylene-co-vinyl acetate) hydrophobic polymeric material.

The present invention is particularly concerned with the discovery that if the hydrophobic polymeric material used in practice of the present system to produce the capsule walls is hydrolyzed to a certain, predetermined, degree, the capsule walls exhibit improved characteristics with respect to permeability and other physical qualities.

The un-ionized, agitated, encapsulating system using such polymeric poly(ethylene-co-vinyl acetate) material results, without more, in a deposit of the wall-forming material around the dispersed entities of intended capsule core material, such as water, aqueous solutions or water soluble materials therein. By reason of the viscosity and volume relation of the dispersed phase of wall-forming polymer solution, that phase is capable of deposit around the dispersed entities of intended core material and is also capable, after deposit, of maintaining itself as an embryonic wall against the shearing forces that exist as an incident of the required agitation of the system. The deposits quickly accumulate to a maximum thickness, which thickness may be varied by varying the amount of the wall material provided and the degree and type of agitation used. The amount of capsule wall material required or desired may vary in accordance with the need for protection of the capsule core material and the protective characteristics of the wall-forming material selected for use.

Depending on the nature of the core material and on that of the wall material, the capsules initially formed in the liquid vehicle by this system are more or less durable. Various supplemental treatments of the capsules so-formed may optionally be employed to harden the capsule walls and thereby impart to them, among other properties, greater durability and greater impermeability relative to the core material and to the environment.

The present process for making capsules, en masse, in a liquid vehicle by establishing a system as defined above, differs from the prior art processes in that the specific polymeric material for capsule walls of the present invention is different from materials disclosed in the prior art, and differs particularly in that the polymeric material is hydrolyzed to a specific and particular degree thus yielding improved capsules. This process using the special wall materials having the noted characteristics is applicable to the encapsulation of a wide range of core materials, including many that cannot be successfully encapsulated and contained by processes described in the prior art; and this process is particularly capable of encapsulating water and water-like liquid core materials as well as solid water-sensitive materials in solution.

Some of the criteria which define the useful classes of materials for the vehicle and the wall-forming solution are these: (1) The hydrophobic polymeric material of the wall-forming solution must be poly(ethylene-co-vinyl acetate) hydrolyzed to a particular, specified, degree with respect to the vinyl acetate moiety. (2) The solution of polymeric materials which form the capsule wall must be capable of wetting the core material in order to deposit around the capsule core entities. (With further regard to wetting properties, the poly(ethylene-co-vinyl acetate) has hydroxyl and acetate groups, the wetting properties of which in certain instances may be enhances by the solvent). (3) The phase-separated solution of the poly(ethylene-co-vinyl acetate) material should have a viscosity, preferably about 1,000 to 4,000 centipoises, such that it may deposit itself and maintain itself deposited around the capsule core entities, despite shearing forces of agitation required to maintain a dispersion. (4) The phase-separated solution of copolymer material should constitute such a percentage of the total three-phase system, by volume, preferably less than about 5 percent, that it can exist as a dispersed phase of mobile entities capable of deposit around the core entities. (5) The core material, the solution of copolymer, and the vehicle must be mutually immiscible and chemically inert toward each other.

As previously stated, the capsule wall material for use in the present invention is a partially hydrolyzed derivative of a copolymer of ethylene and vinyl acetate--named poly(ethylene-co-vinyl acetate). Some vinyl acetate moieties of each molecule are hydrolyzed to yield polymeric molecules having ethylene groups, vinyl acetate groups and vinyl alcohol groups. It has been discovered that poly(ethylene-co-vinyl acetate) is especially effective as capsule wall material in the present invention when the vinyl acetate content has been partially hydrolyzed to a particular, predetermined, content of vinyl alcohol. The reason for such effectiveness is not entirely understood; but, as will be demonstrated in Examples below, the effectiveness is certainly manifest. A structural representation of the compound used in this invention is

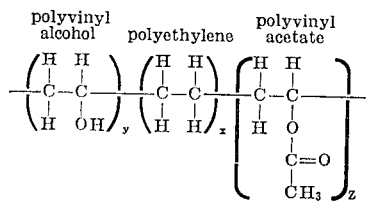

wherein $x$, $y$ and $z$ represent mol fractions of ethylene, vinyl alcohol and vinyl acetate, respectively. In unhydrolyzed polymeric material there can be discussed a mol fraction of ethylene and vinyl acetate; and such a fraction can also be applied to the partially hydrolyzed capsule wall material of this invention. In the case of this invention, however, the fraction is that of ethylene groups to the total of ethylene groups, vinyl acetate groups and vinyl alcohol groups, combined, or the mol percent of ethylene groups present. That ratio for materials used in this invention can be from 0.70 to about 0.85;—about 0.75 to 0.85 being preferred and about 0.80 being most preferred.

Poly(ethylene-co-vinyl acetate) must be hydrolyzed to a particular extent for use in the present invention. Vinyl acetate groups are hydrolyzed to vinyl alcohol groups and it has been discovered that from 38 to 55 percent of the vinyl acetate groups must be hydrolyzed to provide the improved capsule wall material. In the most preferred case, referring to the structural representation above, $x$ (ethylene) equals about 0.80, $y$ (vinyl alcohol) equals about 0.075 to 0.105, and $z$ (vinyl acetate) equals about 0.095 to 0.125. For reasons not entirely understood, poly(ethylene-co-vinyl acetate) is not eligible for use in this invention wherein the vinyl acetate is hydrolyzed in an amount less than about 38 percent or more than about 55 percent. The most preferred limits of hydrolysis of the vinyl acetate to vinyl alcohol is about 43 to 53 percent.

What is believed to be important and patentable and to represent an unobvious advance in the art in the present invention resides in the discovery that a particular polymer provides improved capsule characteristics in manufacture of minute capsules. Partially hydrolyzed poly(ethylene-co-vinyl acetate) has been discovered to be an especially effective capsule wall material when about 38 to 55 mol percent of the vinyl acetate has been hydrolyzed to vinyl alcohol groups. The partially hydrolyzed polymeric material eligible for use in this invention has, generally, a molecular weight of about 50,000, more or less;—the molecular weight not being of critical importance except that if it is too great the polymer will be relatively insoluble in the system and if it is too low there may be some difficulty in the physical character of the separated phase. Material having a wide range of molecular weights is eligible for use. The stated criterion that the core material, the polymer solution, and the vehicle be mutually immiscible is used in the ordinary sense that their separate existence in the system must not be impaired by any reactivity or miscibility between them.

Prefabricated systems for use in carrying out the process of this invention may be established and stored for future use. Even unskilled operators may complete such systems by the addition of missing material along with agitation and heat, if necessary, together with agencies for hardening of the capsule walls, to make capsules at a later time. The missing material may involve any of those three necessary to form an operative system, and the absence of any component may be total or partial.

The preferred system, utilizing the specified poly(ethylene-co-vinyl acetate) materials, is one in which the liquid used as the solvent for the wall-forming material is also used as a major component of the manufacturing vehicle. The vehicle then must contain another material, in solution in it, which material is complementary to the wall-forming material in the sense that it creates an immiscibility between the vehicle and the solution of wall-forming polymeric material and induces a liquid-liquid phase separation. In other words, it completes a liquid system in which the suitably-viscous wall-forming solution of poly(ethylene-co-vinyl acetate) material can exist as a separate phase dispersed in the vehicle because of forces between the polymeric material of the wall-forming solution and the complementary material. Without the complementary material, if the vehicle included or consisted of the same liquid that is used as the solvent for the wall-forming polymer, the vehicle would be miscible with and would dilute the polymer solution, which then would not exist as a separate phase of proper viscosity. Thus, the stated immiscibility between the vehicle and the wall-forming polymer solution requires the presence of a complementary material as a constituent of the vehicle when the vehicle includes a liquid miscible with or identical to the solvent used in the wall-forming solution.

Complementary materials for use in the present invention include such diverse polymers as: polybutadiene (8,000–10,000 molecular weight); polybutene (330–780 molecular weight); polydimethyl siloxane; cottonseed oil, linseed oil, soya oil, and other vegetable oils and mineral oils, either halogenated or not; and the like. The general process of liquid-liquid phase separation is taught by the prior art and complementary materials, generally, taught as eligible therein are useful, also, here. Kind and type of complementary material is not considered to be a part of the present invention. The complementary polymeric material used in the present encapsulating system can be any polymer that has less affinity for the core material than does the poly(ethylene-co-vinyl acetate) capsule wall material, so that the capsule wall material will deposit preferentially around the core entities.

While encapsulating systems utilizing the poly(ethylene-co-vinyl acetate) are particularly useful in the encapsulation of materials selected from the class comprising water, aqueous solutions, hydroxy-containing compounds, polyhydroxy-containing compounds, aqueous solutions of hydroxy and polyhydroxy compounds, and solutions and dispersions of solids therein, they are also capable of encapsulating solid materials such as, for example, titanium dioxide, potassium penicillin, sodium chloride, aspirin, methylene blue, pepsin, starches, methyl cellulose, and gelatin, as well as any other materials which are not reactive or soluble with other phases of the three-phase system in order to maintain their existence. Particular materials especially eligible to be contained in capsules of this invention are formamide, glycerine, glycols, amines such as triethylenetetramine, diethylenetriamine, aminoethylethanolamine, diethyleneamine and the like, and carbonates such as ethylene carbonate, propylene carbonate and the like. Mixtures of any of the foregoing core materials in the same core entity or as providing different core entities in the same three-phase system may be used. Materials particularly intended as capsule core materials herein must, of course, be substantially immiscible with other components of the encapsulating system.

The size range of capsules made by the present invention can extend from a lower limit of a few to several microns up to a larger limit of several thousand microns in average diameter. The usual size for capsules made according to the present process are from about 1 or 2 microns to about 15,000 microns in average diameter. Capsules of the aforementioned size are considered to be minute and are preferred. The most usual size for capsules manufactured according to the present invention is within a range of from about 5 microns up to about 2,500 microns. Capsules made according to the present invention can be made to contain a range of amounts of internal phase material. The capsules can contain from 0 to more than 99 percent, by weight, of the internal phase material. The most usual and preferred range for the amount of material to be contained in capsules manufactured according to the present invention is from about 50 to about 97 percent, by weight. The aforementioned capsules having zero contents are considered to be minute spheres of polymeric material and can be manufactured by the process of the present invention by omitting the intended internal phase material. Hollow capsules can be manufactured, wherein the initial capsule contents are removed.

Solvents eligible for use in this invention include organic solvents which can dissolve both the poly(ethylene-co-vinyl acetate) and the complementary phase-separation-inducing material. The solvents are generally well-known, or are easily found without undue experimentation, and include: cyclohexanol; methylisobutyl ketone; trichloroethylene; tetrachloroethylene; methylene chloride; carbon tetrachloride; chloroform; toluene; xylene; benzene; chlorobenzene; ethylene glycol monobutyl ether; 1-methyl-2-pyrrolidinone; pyridine; butanol and the like. Kinds and types of particular eligible solvents is not considered to be a novel part of the present invention.

In order to more completely exPlain the invention, a particular procedure for establishing a suitable encapsulating system will be described. This particular procedure involves the formation of an un-ionized solution system comprising two different polymeric materials and a common solvent;—one polymeric material being the poly(ethylene-co-vinyl acetate) capsule wall material and the other polymeric material being the complementary phase-separation-inducing material. Separation of this system into two separate liquid solution phases (one containing a major amount of the poly(ethylene-co-vinyl acetate) and the other containing a major amount of the complementary polymeric material) is accomplished by a phenomenon of liquid-liquid phase separation known from the work of Dobry et al. published in "Journal of Polymer Science," Vol. 2, No. 1, pp. 90–100 (1947). The two polymeric materials and the solvent can be assembled in any order to effect the phase separation, but it is preferable first to form a dilute solution of the poly(ethylene-co-vinyl acetate) that is intended to be in the capsule-wall-forming phase, and then to induce liquid-liquid phase separation by addition of the complementary, polymeric material, whose only role is to induce and maintain the phase separation.

The order of addition can be reversed, or the two polymeric materials and the solvent can be brought together at one time, once the proper quantitative relations are established for the particular materials being used. The resulting volume and viscosity (mostly as it is controlled by concentration) of the two separate phases are independent of the order of assembly.

The core material, always a minor component of the total volume of the system, can be added before, during or after the formation of the solution or its separation into two solution phases. Similarly, the agitation of the system can be begun before, during, or after either of these steps. It is preferred, however, to agitate before, during, and after the phase separation, and to introduce the core material before the phase separation has taken place.

The intensity of agitation is made such as to reduce the core material to the desired entity size, if such is necessary, and, in any event, to assure thorough dispersion of it in the vehicle. The core entity size is pre-selected to give the desired capsule size after allowance for encapsulating wall thickness. With solid core materials, the entity size can be predetermined and obtained by suitable grinding or milling.

When the three-phase capsule-forming system is established in this way, the continuous or vehicle phase consists of a more dilute and less viscous solution containing the greater part of the complementary polymeric material; and that polymeric material is the material which imparts the necessary immiscibility between the vehicle and the wall-forming solution phase and permits the latter to exist as a separate dispersed phase. Any small amount of complementary polymeric material that may pass into the separated wall-forming solution phase by entrainment or otherwise is not objectionable.

If desired or required, the three-phase system, once containing capsules, may be treated with a small amount of some compound which will react with hydroxy groups in the capsule wall material to chemically harden and cross-link the capsule walls. Preferred amongst the hardening or treatment materials are diisocyanate or polyisocyanate materials such as toluene diisocyanate and diacid halides such as malonyl-chloride, oxalyl chloride, sulfonyl chloride, thionyl chloride, and the like. Another method for treating the capsule walls is by reaction with an alkali alkoxide, the mechanism of which reaction is not entirely understood. Examples of alkali alkoxides include sodium, potassium, lithium and cesium methoxide, ethoxide, propoxide, and the like.

BRIEF DESCRIPTION OF THE DRAWING

The FIGURE is a subjective graphical representation of the relation between capsule quality and percent hydrolysis as applied to the poly(ethylene-co-vinyl acetate), partially hydrolyzed. For reasons not entirely understood, the change in quality with change of percent hydrolysis is quite pronounced and remarkable. At hydrolysis of less than about 38 percent, the separated phase prepared according to established liquid-liquid phase separation techniques, is not adequately viscous to form useful capsule walls and what walls which are formed are sticky and generally unmanageable in attempts to isolate the capsules. Capsules made using materials having less than 38 percent hydrolysis have a tendency to agglomerate during the encapsulation process and lack of vinyl alcohol groups prevents adequate cross-linking across hydroxyl groups.

At hydrolysis of greater than about 55 percent, the separated phase is too viscous and exists as a semi-solid, stringy, precipitous phase. The change from "good" to "no-good" is abrupt and appears to be complete within a few percent.

At hydrolysis between 38 and 43 percent, capsules of adequate quality can be prepared with the quality improving as 43 percent hydrolysis is approached.

Between 43 and 53 percent hydrolysis the capsule equality is at a maximum for this system and the capsules are particularly suited for containing polar liquids for long periods of time.

From hydrolysis of 53 to 54 or 55 percent, capsule quality declines rapidly and, a hydrolysis of about 56 percent capsules, can no longer be successfully manufactured.

DESCRIPTION OF THE PREFERRED EMBODIMENTS

EXAMPLE I

In this example, minute capsules will be manufactured which contain glycerol as a polar internal phase. If desired or required, the glycerol can have some small amount of dye or other coloring material dissolved or dispersed therein for demonstrative effect or for some other purpose. The capsule wall-forming polymeric material used in this example and in all of the following examples is poly(ethylene-co-vinyl acetate) hydrolyzed to a particular percent as hereinabove described. Each example will specify the degree of hydrolysis for the particular material of that example. Partially hydrolyzed poly(ethylene-co-vinyl acetate) is available from E. I. du Pont de Nemours & Co., Inc. Wilmington, Del., United States of America under the trademark designation, "Elvon PB-7802" hydroxyvinyl resin.

This example utilizes poly(ethylene-co-vinyl acetate) which is about 50–53 percent hydrolyzed, 3.12 grams of which is dissolved in 125 milliliters of toluene to yield a solution of the capsule wall-forming material. The solution is heated to 50°–60 C. and the following are added with continued agitation: 125 milliliters of a 50 percent, by weight, solution of polydimethyl siloxane in toluene to serve as the complementary phase-separation-inducing polymeric material and 30 milliliters of glycerol with a small amount of a colored crystal violet salt dissolved therein to serve as the capsule core or internal phase material. An example of the polydimethyl siloxane used herein is "L-45" (trademark) silicon fluid having a viscosity of about 500 centistokes and sold by Union Carbide Corporation, New York, N.Y., United States of America. After addition of the above materials, a three-phase system exists as afore-described, including: a continuous phase of toluene having a major amount of the siloxane and some of the capsule wall material dissolved therein, a discontinuous phase of droplets of the blue-colored glycerol as intended capsule core material and a discontinuous phase of liquid, phase-separated, droplets of a concentrated solution of the capsule wall material in toluene;—said capsule wall material droplets wetting and enwrapping the capsule core entities to yield embryonic capsules. The system, at this point, then, has already yielded capsules of a liquid-walled nature containing a polar liquid. Agitation is continued while the system is permitted to cool to room temperature.

As a test, 50 milliliter portions of the cooled capsule containing system are treated by adding toluene diisocyanate in amounts from 0.5 milliliter to 4 milliliters and the portions are stirred at room temperature for about 16 hours. Agitation is stopped, the supernatant is removed, the capsules are washed with hexane and then with water and are then dried. The resulting capsules do not agglomerate and they release blue-colored glycerol on rupture. The capsules, left in ambient conditions, do not appear to exude the glycerol internal phase.

EXAMPLE II

This example uses the same capsule wall material as that used in Example I, above. 5 grams of the capsule wall material is dissolved in 500 milliliters of toluene at above about 60° C. The solution is placed in a preheated Waring Blendor (trademark) cup under low agitation;—care being employed with regard to avoiding fire and explosion. Then, 100 milliliters of an 80/20-glycerol/water solution is added as a capsule internal phase, the agitation is increased to a rapid rate and is continued for about 5 minutes to obtain a fine dispersion. 25 milliliters of cottonseed oil is added as a phase-separation inducer and agitation is continued for 2 minutes at the rapid rate. The system is then chilled to 25° C. and 200 milliliters of a solution of 5 percent, by weight, "Mondur CB-75" (trademark) in toluene is added to cross-link and chemically harden the capsule wall material. "Mondur CB-75" is a toluene diisocyanate adduct of trimethanol propane and is sold by the Mobay Chemical Company, Pittsburgh, Pa., United States of America. The system is stirred at low rate for a few hours at room temperature and then for about 10 hours at about 45° C. The capsules can then be coated onto paper or isolated as a liquid-containing powder. The individual capsules from this example are about 5 to 20 microns in average diameter.

EXAMPLE III

This example is performed identically with Example II, above, with the exceptions that tetrachloroethylene is substituted, volume-for-volume for the toluene of that example and the capsule wall material is hardened by reaction with toluene diisocyanate instead of the toluene diisocyanate adduct of that example. The individual capsules from this example are about 5 to 20 microns in average diameter.

EXAMPLE IV

Examples I and II are repeated using a liquid polybutadiene as the complementary phase separation inducer. Capsule size can be regulated somewhat by control of the degree of agitation, the ratio of the degree of agitation, the ratio of capsule wall material to capsule internal phase material, the temperature of the system and the like.

EXAMPLE V 10 grams of the poly(ethylene-co-vinyl acetate) which is 43 to 53 percent hydrolyzed is dissolved in 500 milliliters of trichloroethylene and cooled to about 10° to 15° C. Into that solution is dispersed about 100 milliliters of capsule core material (water, glycerol, etc.,—100 grams of the material if it is a solid) and about 90 milliliters of cottonseed oil is added to serve as phase-separation-inducing material. Embryonic capsules are thus formed and the embryonic capsule walls are chemically hardened by adding 50 milliliters of a 20 percent, by weight, solution of "Mondur CB-75" (trademark) in trichloroethylene to the capsule-containing system and stirring overnight. The capsules are isolated by decanting the capsule manufacturing liquid, washing the capsules with trichloroethylene and drying them by evaporating the trichloroethylene. The hardened and isolated capsules appeared of high quality with little tendency toward exudation of the capsule contents.

EXAMPLE VI

As a test, 10 grams of the poly(ethylene-co-vinyl acetate) which was 38 percent hydrolyzed, was dissolved in 600 milliliters of toluene and into that solution was dispersed 70 milliliters of an 80/20-glycerol/water solution to serve as capsule core material and 50 milliliters of cottonseed oil to serve as phase-separation-inducing material. The temperature during this agitation and dispersing ranged from about 45° to about 25° C. On addition of the cottonseed oil, a phase separation of the capsule wall material did occur and embryonic capsules did form, but the separated phase was not adequately viscous for good capsule manufacture and the separated phase did not wrap the capsule core droplets well. Nevertheless, 5 milliliters of the "Mondur CB-75" (trademark), above-mentioned, and 5 milliliters of toluene diisocyanate were added to harden the capsule walls and completed capsules were obtained after stirring the system for about 16 hours. The capsules were isolated by decanting the manufacturing liquid, washing the capsules with toluene and drying them by evaporating the toluene. The capsules obtained in this example were not of high quality but would be usable in some instances.

EXAMPLE VII

This example was conducted identically with that of Example VI, above, with the exception that the poly(ethylene-co-vinyl acetate) was about 43 percent hydrolyzed. The separated phase of capsule wall material in this example was of the proper viscosity and wetted and wrapped the capsule core entities very well to yield embryonic capsules of high quality. The hardened and isolated capsules appeared of high quality with little tendency toward exudation of the capsule contents.

EXAMPLE VIII

To continue the tests of Examples VI and VII, this example was conducted identically with those above, but using poly(ethylene-co-vinyl acetate) which was about 50–53% hydrolyzed. The capsules of this example were of high quality substantially identical with those of Example VII, above.

EXAMPLE IX

In a continuation of the test, the same technique as above was followed but using poly(ethylene-co-vinyl acetate) which was about 54 percent hydrolyzed. The separated phase of capsule wall material in this example was highly viscous and exhibited some difficulty in wrapping the capsule core material. Capsules of a fair quality were isolated, however.

EXAMPLE X

As a last part of the test an encapsulation attempt was made using poly(ethylene-co-vinyl acetate) which was 56 percent hydrolyzed. The separated phase was stringy and semi-solid and would not wrap around intended capsule cores to yield capsules.

The example was repeated using poly(ethylene-co-vinyl acetate) which was 56 percent hydrolyzed and again with material which was 59 percent hydrolyzed. In both cases the separated phase was substantially solid and did not yield capsules.

It is important to note that in all of the poly(ethylene-co-vinyl acetate) materials used in the above examples, the molecular weights were substantially the same;—the differences in behavior of the various separated liquid phases being due entirely to differences in degree of hydrolysis.

EXAMPLE XI

This example is performed similarly with any of the above examples which resulted in acceptable capsules with the exception that the capsule wall hardening material is sodium methoxide supplied as 20 milliliters of a 0.1 Normal solution in 1/10-methanol/benzene. The resulting capsules can be coated onto a substrate to dry or can be isolated by decanting the manufacturing liquid, washing the capsules with petroleum ether and drying.

EXAMPLES XII–XVI

The test of Examples VI–X, above, is repeated using 60 milliliters of a 70/30-glycerol/formamide solution in place of the glycerol/water solution as capsule core material. The test results are substantially the same herein as in Examples VI–X.

EXAMPLE XVII

Example VIII, above, is repeated but using 70 milliliters of 50 percent, by weight, aqueous solution of acetamide as capsule core material in place of the glycerol/water solution. Capsules of high quality are manufactured.

EXAMPLE XVIII

Example VIII, above, is repeated but using 70 milliliters of a 3 percent, by weight, solution of oxamide in 70 percent, by weight, aqueous glycerol solution. Capsules of high quality are manufactured.

EXAMPLE XIX

Example VIII, above, is repeated but using 50 milliliters of a 4 percent, by weight, solution of malonyl chloride in toluene as the capsule wall hardening material in place of the "Mondur CB-75" and the toluene diisocyanate. In using this diacid chloride hardening material, the capsules need only be stirred for about 30 minutes before isolation. Capsules of high quality are manufactured.

What is claimed is:

1. In a process of forming minute capsules, en masse, which comprises establishing an agitated system consisting of a liquid vehicle constituting a major portion of the system by volume and forming a continuous liquid first phase, a second phase dispersed therein, consisting of minute mobile entities of capsule core material, and a third phase dispersed therein constituting a minor but significant portion of said system by volume, and consisting of minute mobile liquid entities of a wall-forming solution of a hydrophobic polymeric material, the capsule core material being wettable by said wall-forming solution and the three phases being mutually immiscible, whereby said wall-forming solution deposits on and around the capsule core entities to form a protective wall:

the improvement which comprises utilizing, as the hydrophobic polymeric material, poly(ethylene-co-vinyl acetate) having the vinyl acetate groups hydrolyzed to vinyl alcohol groups in the amount of 38 to 55 percent.

2. The process of claim 1 wherein, of the poly(ethylene-co-vinyl acetate), ethylene groups constitute 70 to 85 percent of the total polymer groups present.

3. In a process of forming minute capsules, en masse, which comprises: (a) establishing an agitated system consisting of a liquid vehicle constituting a major portion of the system by volume and forming a continuous liquid first phase, a second phase dispersed therein, consisting of minute mobile entities of capsule core material, and a third phase dispersed therein constituting a minor but significant portion of said system by volume, and consisting of minute mobile liquid entities of a wall-forming solution of a hydrophobic polymeric material, said three phases being mutually immiscible, whereby said wall-forming solution deposits on and around the capsule core entities to form a protective wall, and (b) hardening the walls so formed:

the improvement which comprises utilizing, as the hydrophobic polymeric material, poly(ethylene-co-vinyl acetate) having the vinyl acetate groups hydrolyzed to vinyl alcohol groups in the amount of 38 to 55 percent.

4. The process of claim 3 wherein, of the poly(ethylene-co-vinyl acetate), ethylene groups constitute 70 to 85 percent of the total polymer groups present.

5. The process of claim 3 wherein hardening the protective wall is accomplished by reaction with a treatment material selected from the group of materials consisting of diisocyanates, polyisocyanates and diacid chlorides.

6. The process of claim 3 wherein hardening the protective wall is accomplished by reaction with an alkali alkoxide.

7. A three-phase capsule-forming system capable of forming minute capsules en masse, consisting essentially of a. a liquid vehicle constituting a major portion of the system by volume and forming a continuous liquid first phase, b. a second phase dispersed therein constituting a minor but significant portion of said system by volume, consisting of minute discrete liquid entities of a wall-forming solution of poly(ethylene-co-vinyl acetate) having from 38 to 55 percent of the vinyl acetate groups hydrolyzed to vinyl alcohol groups, and c. a third phase dispersed therein constituting the remainder of the system, by volume, consisting of minute discrete entities of capsule core material, the core material being wettable by said wall-forming solution and the said three phases being mutually immiscible.

8. The three-phase system of claim 7 wherein the mol percent of ethylene in the poly(ethylene-co-vinyl acetate) is about 70 to 85 percent.

* * * * *